June 24, 1930.  N. L. SULLIVAN  1,766,087
MUSIC CHART BLACKBOARD

Filed Sept. 9, 1926

INVENTOR.
Nell Lucille Sullivan,
BY
Morsell, Keeney & Morsell
ATTORNEYS.

Patented June 24, 1930

1,766,087

UNITED STATES PATENT OFFICE

NELL LUCILLE SULLIVAN, OF NEW LONDON, WISCONSIN

MUSIC CHART BLACKBOARD

Application filed September 9, 1926. Serial No. 134,491.

This invention relates to improvements in music chart blackboards.

It is one of the objects of the present invention to provide music chart blackboards on which there is a delineation of a piano or organ keyboard and one or more music staffs.

A further object of this invention is to provide, as a new article of manufacture, a blackboard which is especially adapted for the teaching of music.

A further object of the invention is to provide music chart blackboards which will facilitate the teaching of music by providing convenient spaces on the staff or keyboard for the writing of characters, which characters can be readily visualized in connection with the keyboard delineation.

With the above main, and other incidental objects in view, the invention consists of the improved music chart blackboard as set forth in the claims and all equivalents thereof.

In the accompanying drawing in which the same reference characters indicate the same parts in all of the views.

Figure 1:
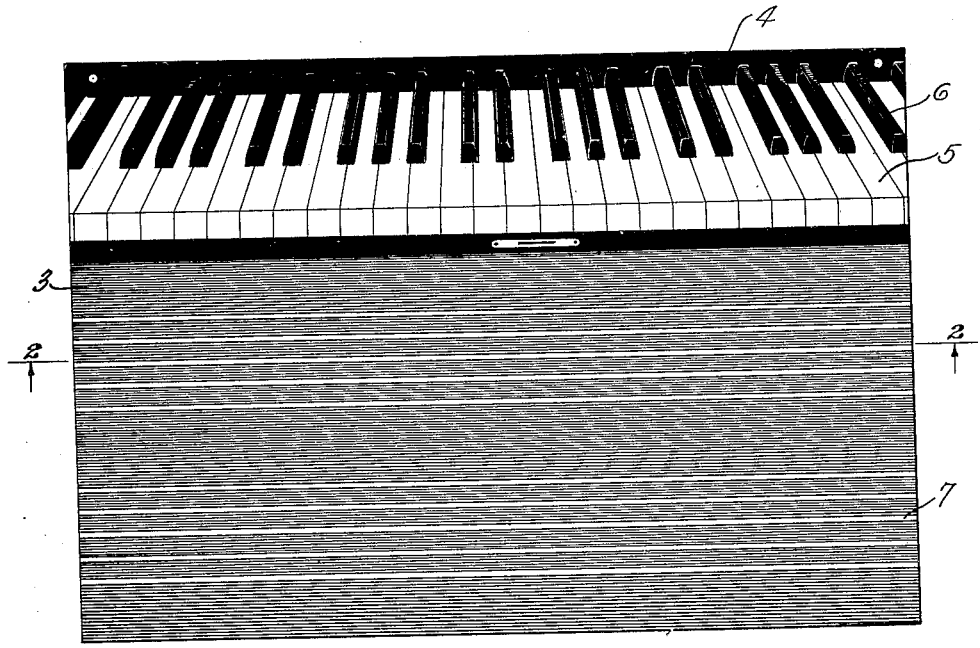
Fig. 1, is a front view of the improved music chart blackboard.
Figure 2:
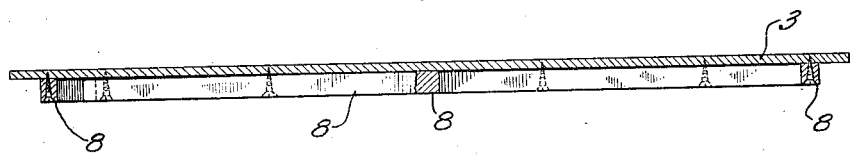
Fig. 2, is a section taken on line 2—2 of Fig. 1.

Referring more particularly to the accompanying drawing, the numeral 3 designates the board upon which is delineated a piano keyboard 4, comprising white keys 5, and black keys 6, which is painted or otherwise permanently placed upon the board. Music staffs 7 are also indicated on the board, and are placed thereon preferably in white paint.

Any type of blackboard may be used as a base upon which to place the keyboard and staffs, a common form of board being shown here. It comprises the main board 3, and brace members 8 secured to the underside thereof.

The improved music chart blackboard is very useful in schools. The instructor may fill in the staffs with notes or he may write upon the keyboard while lecturing to the class. The notes are so placed upon the staffs that they may be readily associated with the piano keys on the keyboard delineation which they designate. Thus, the teaching of music is greatly facilitated, and the instructions are rendered more intelligible to the student.

From the foregoing description, it may be seen that the improved music chart blackboard is simple in construction, is easy to use, and is well adapted for the purpose described.

What I claim as my invention is:

1. As a new article of manufacture, a blackboard having delineated thereon a musical instrument keyboard in perspective and music staffs arranged parallel to said keyboard delineation, said board having a surface upon which characters or notes may be inscribed upon said staffs or keyboard so that the notes may be readily associated with the keys which they designate, the construction of the blackboard permitting the erasure of the inscribed notes and the insertion of new ones.

2. As a new article of manufacture, a blackboard having delineated theeron a musical instrument keyboard in perspective and music staffs below said keyboard, said blackboard having a surface upon which characters or notes may be removably inscribed upon said staffs or keyboard so that the notes or characters may be readily associated with the keys or staff notations which they designate.

In testimony whereof, I affix my signature.

NELL LUCILLE SULLIVAN.